United States Patent [19]

Tominaga et al.

[11] 4,327,930
[45] May 4, 1982

[54] FRAME FOR TWO-WHEELED VEHICLE

[75] Inventors: Nobuyoshi Tominaga, Hamamatsu; Nobuyoshi Kurai, Iwata; Hajime Ueno; Sadahide Suzuki, both of Shizuoka, all of Japan

[73] Assignee: Yamaha Hatsudoki Kabushiki Kaisha, Iwata, Japan

[21] Appl. No.: 129,329

[22] Filed: Mar. 11, 1980

[30] Foreign Application Priority Data

Mar. 19, 1979 [JP] Japan .................................. 54-32075

[51] Int. Cl.³ .............................................. B62K 19/30
[52] U.S. Cl. ..................................... 280/284; 180/227
[58] Field of Search ..................... 280/284, 227, 226; 180/227

[56] References Cited

U.S. PATENT DOCUMENTS

| 1,071,892 | 9/1913 | Diepenhorst et al. | 280/284 |
| 1,479,738 | 1/1924 | Pullin | 180/227 X |
| 3,877,539 | 4/1975 | Tilkens | 180/227 |

FOREIGN PATENT DOCUMENTS

| 173621 | 4/1952 | Austria | 180/227 |
| 438800 | 8/1948 | Italy | 180/227 |
| 492700 | 3/1954 | Italy | 280/284 |

Primary Examiner—John A. Pekar
Attorney, Agent, or Firm—Donald D. Mon

[57] ABSTRACT

A frame for a two-wheeled vehicle such as a motorcycle or a power-driven cycle or a bicycle which has a bifurcated rear portion that forms a chamber to receive a suspension member. The suspension member interlinks the frame and an upper portion of a rear arm that has pivot points for the joinder to the suspension, for the frame, and for the rear wheel.

3 Claims, 4 Drawing Figures

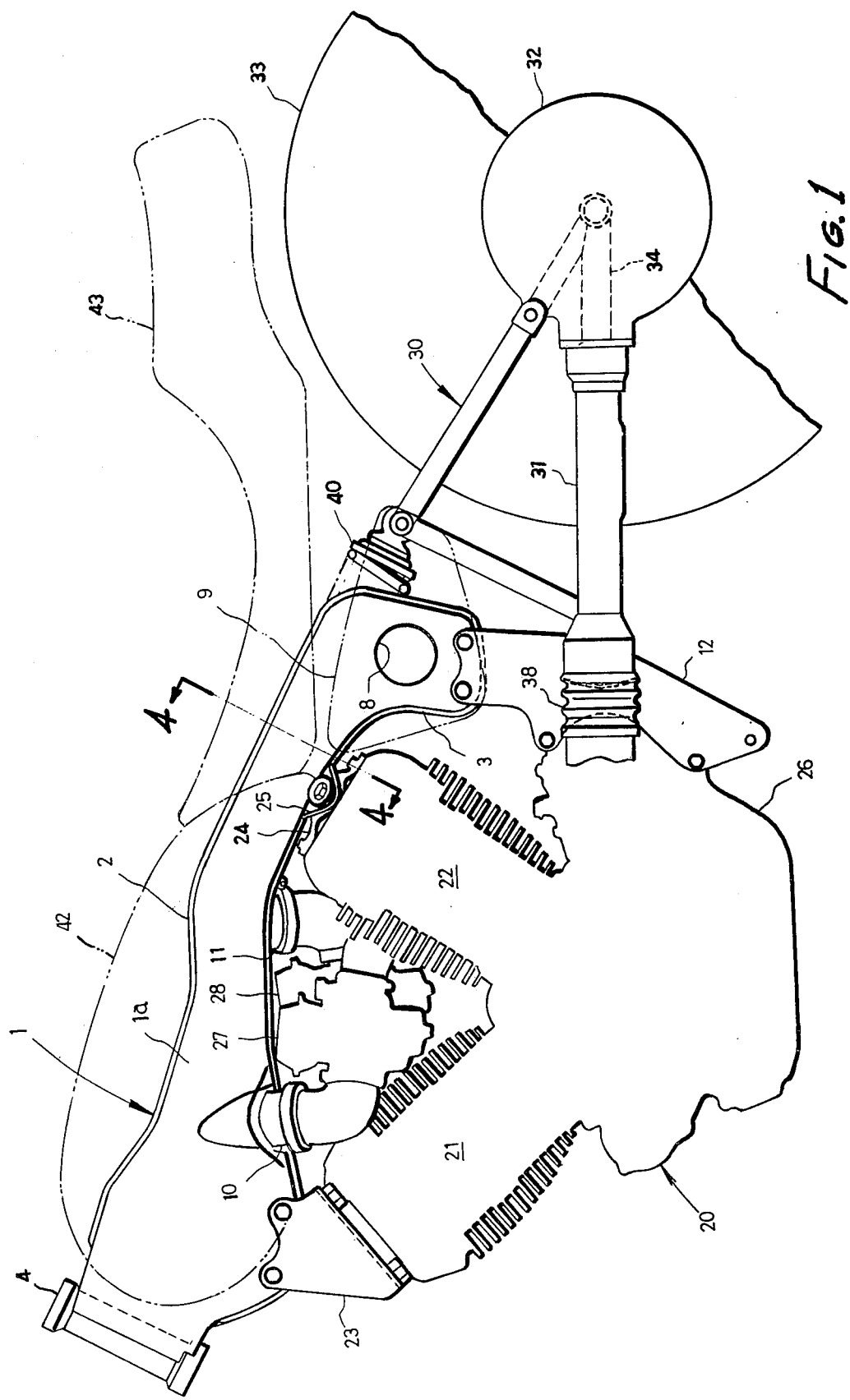

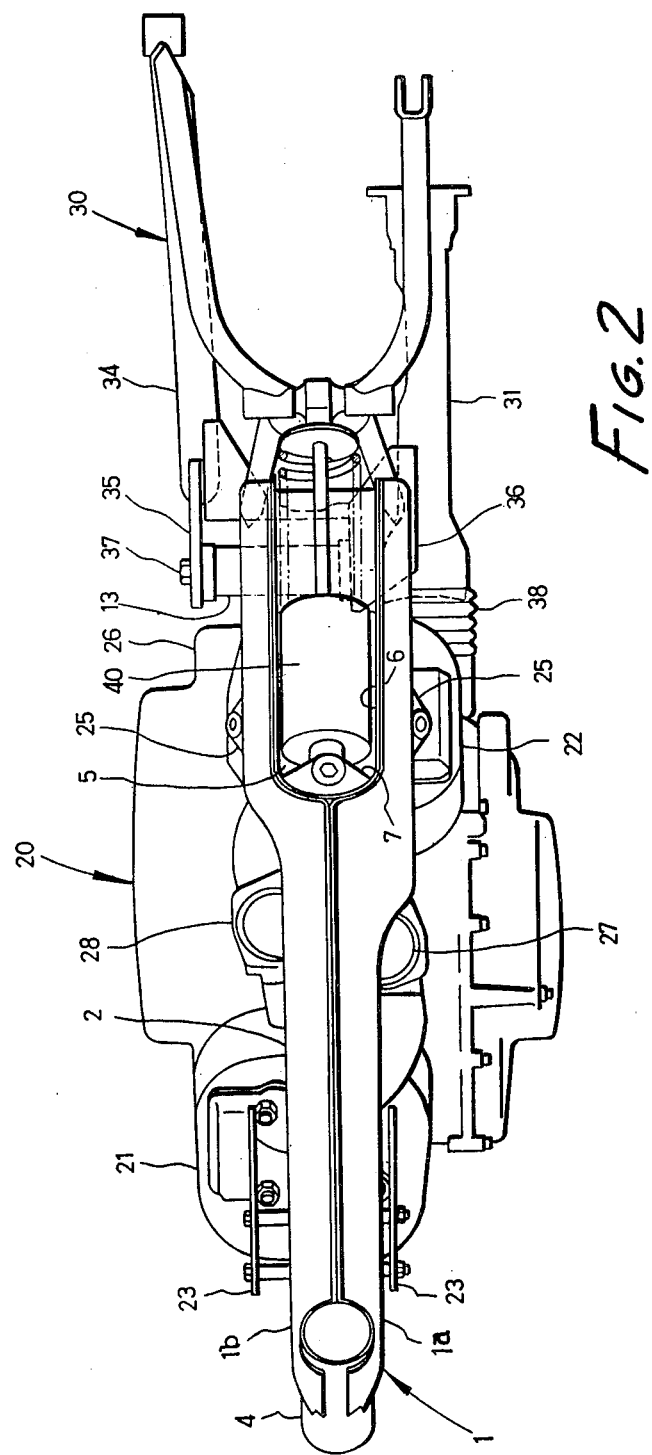

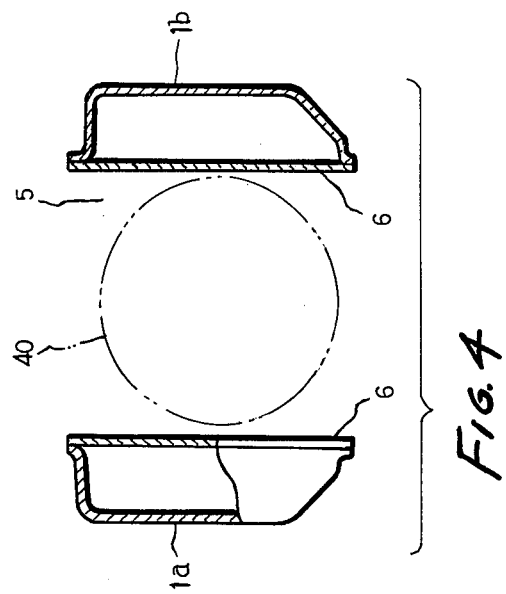
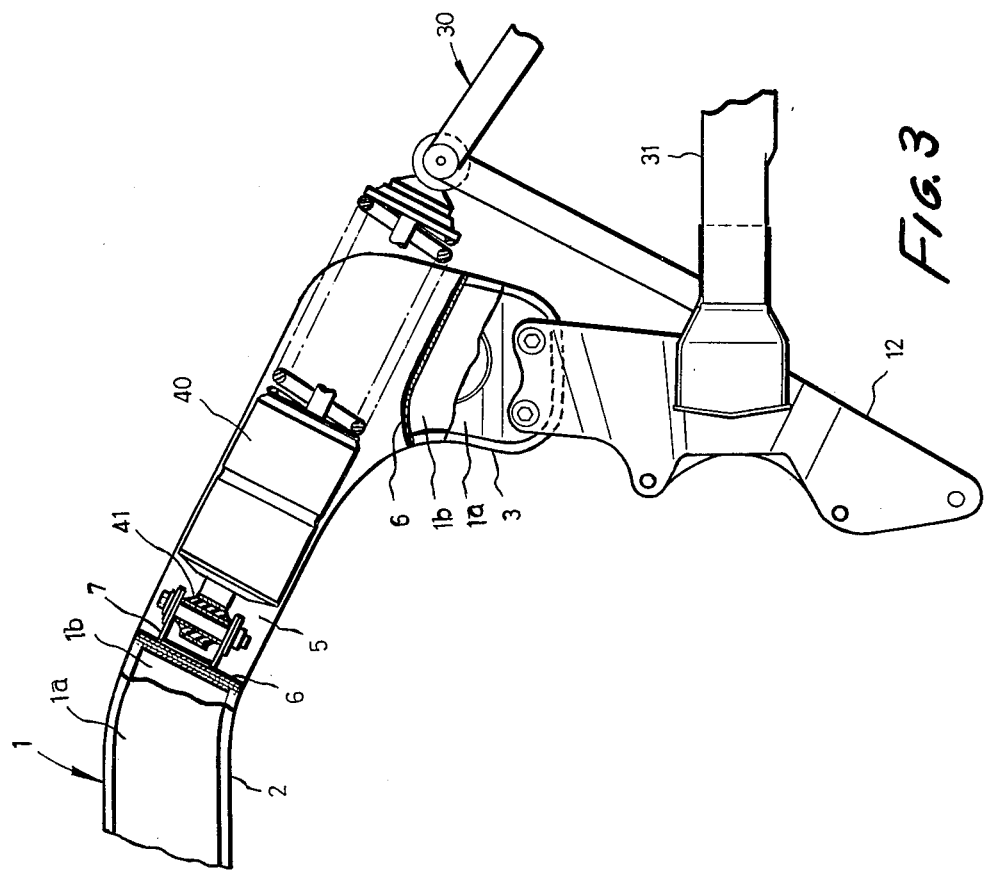

FRAME FOR TWO-WHEELED VEHICLE

FIELD OF THE INVENTION

This invention relates to a frame structure for a two-wheeled vehicle such as a motorcycle, a power-driven cycle or a bicycle.

BACKGROUND OF THE INVENTION

There is known a two-wheeled vehicle including a rear arm having a generally triangular side elevation, and having a rear end on which a rear wheel is rotatably mounted, a main frame on which the front end of the rear arm is rotatably supported, and a suspension mechanism mounted between the top of the rear arm and the main frame. If a large suspension mechanism is employed in a vehicle having such a suspension mechanism, it is necessary to provide a space for mounting it therein at the sacrifice of space for the main frame. This should, however, not be permitted to result in reduced rigidity of the main frame. Therefore, provision must be made for preventing reduction in the rigidity of the main frame.

BRIEF DESCRIPTION OF THE INVENTION

In view of these circumstances, it is an object of this invention to provide a frame structure which can form a sufficient space for mounting a suspension mechanism therein, and increase the rigidity of a main frame. In order to attain this object according to this invention, the main frame is formed by a pair of transversely spaced metal plate members which are joined together, and an inner plate which is welded between the metal plate members to bifurcate a portion of the main frame, and define a suspension chamber therein.

This invention will now be described in detail with reference to the drawings.

BRIEF DESCRIPTION OF THE DRAWINGS

FIG. 1 is a partly omitted side elevational view showing an embodiment of this invention as applied to a motorcycle;

FIG. 2 is a top plan view of FIG. 1;

FIG. 3 is a fragmentary side elevational view in FIG. 1, partly in section; and

FIG. 4 is an end view taken along the line IV—IV of FIG. 1.

DETAILED DESCRIPTION OF THE DRAWINGS

In the drawings, numeral 1 indicates a main frame formed by a pair of transversely spaced metal plate members 1a and 1b, each having a generally C-shaped cross section. These are joined together along the peripheral edges thereof. Thus, Main frame 1 has a box-shaped cross section.

Main frame 1 includes a tank rail portion 2 and a bent portion 3 extending from the rear end of the tank rail portion 2. A steering head pipe 4 is welded to the front end of the tank rail portion 2. That portion of the main frame 1 which extends from the rear half of the tank rail portion 2 to the top of the bent portion 3 is bifurcated to define a suspension chamber 5 therein. The metal plate members 1a and 1b project laterally to some extent, with their inner faces departing from each other in the region from the rear half of the rear tank rail portion 2 to the bent portion 3, and an inner plate 6 is welded to close the inside opening. The area surrounded by the inner plate 6 defines the suspension chamber 5.

The suspension chamber 5 vertically extends through the main frame 1 as is evident from FIGS. 3 and 4. The metal plate members 1a and 1b are joined to each other at the bottom of the bent portion 3. A bracket 7 having a channel-shaped side elevation is welded to the inner plate 6 at the front end of the suspension chamber 5 as shown in FIG. 3. In the bent portion 3, the metal plate member 1a is formed with a circular opening 8. In FIG. 1, numeral 9 denotes an air cleaner disposed beside the bent portion 3. Air entering the air cleaner 9 flows into the main frame 1 through the opening 8. Air entering the main frame 1 through the opening 8 is drawn into the cylinders of an engine 20 through the intake pipes 10 and 11 connected to the tank rail portion 2 as shown in FIG. 1.

A pair of transversely spaced brackets 12 are rigidly secured to the main frame 1 in depending relationship from the bent portion 3 thereof (FIGS. 1 and 3). A cylindrical bearing pipe 13 extends through the brackets 12 and is secured thereto (FIG. 2). A rear arm 30 is pivotally connected to the bearing pipe 13.

A V-shaped engine 20 has a pair of cylinders 21 and 22 disposed one behind the other longitudinally of the vehicle. A channel-shaped bracket 23 is secured to the head of the front cylinder 21, and extends across the tank rail portion 2 of the main frame 1 in spaced apart relation therefrom. The bracket 23 is secured to the front end of the tank rail portion 2 by collars. A bracket 24 having a pair of transversely spaced, downwardly inclined mounting surfaces is secured to the head of the rear cylinder 22. A pair of brackets 25 each disposed opposite to one of the mounting surfaces of the bracket 24 are welded to the main frame 1. The brakcets 24 and 25 are resiliently connected to each other by rubber bushes not shown. A crank case 26 for the engine 20 is secured to the main frame 1 by the brackets 12.

Numerals 27 and 28 refers to a pair of transversely spaced carburetors. The left carburetor 27 is interposed between the intake pipe 10 and the rear cylinder 22, while the right carburetor 28 is disposed between the intake pipe 11 and the front cylinder 21.

The rear arm 30 is formed to present a generally triangular configuration in side elevation. The left triangular portion of the rear arm 30 includes a bottom pipe 31, and a rear end casing 32. The casing 32 contains therein a large reduction gear (not shown) which is driven by a propeller shaft (not shown) extending through the bottom pipe 31. The right and left triangular portions of the rear arm 30 support a rear wheel 33 rotatably at the rear ends thereof. The aforementioned large reduction gear not shown is secured to the rear wheel 33. It will, thus, be noted that the present motorcycle is provided with a shaft drive system.

The front end of the rear arm 30 is pivotally connected to the bearing pipe 13. A bracket 35 is welded to the front end of a bottom member 34 forming the right triangular portion of the rear arm 30, and a bracket 36 to the bottom pipe 31 forming the left triangular portion, in such a manner that the bearing pipe 13 is interposed between the brackets 35 and 36. The brackets 35 and 36 are supported on a support shaft 37 extending through the brackets 35 and 36, and the support shaft 37 is rotatably mounted in the bearing pipe 13. The engine 20 has an output shaft not shown, but located adjacent to the front end of the bottom pipe 31, and this output shaft is connected to the drive shaft in the bottom pipe 31 by a universal coupling not shown. A dust cover 38 of the bellows type is connected between the front end of the bottom pipe 31 and the crank case 26 (FIG. 2).

Numeral 40 indicates a suspension provided with an oleo damper. The suspension 40 is mounted in the suspension chamber 5 formed in the main frame 1. The suspension 40 has a front end connected by a rubber bush 41 to a pin on the bracket 7 secured to the inner plate 6 (FIG. 3), and a rear end connected by a rubber bush not shown to a pin on the top of the rear arm 30.

In FIG. 1, numeral 42 denotes a fuel tank, and 43, a seat.

In the embodiment constructed as described above, the rear arm 30 rotates about the support shaft 37 and the bearing pipe 13 as the rear arm 30 rotates, too, and by virtue of the rotation of the top, the suspension 40 expands and contracts to thereby absorb the vertical vibration of the rear wheel 33. As the suspension chamber 5 vertically extends through the main frame 1, the wind generated when the vehicle is running passes through the suspension chamber 5. Therefore, the cooling of the suspension 40 is improved, and the characteristics of the suspension 40 while the vehicle is running, especially its damping characteristics, are stabilized.

While in the embodiment described, the main frame 1 essentially comprises the tank rail portion 2 and the bent portion 3, this invention is not limited to this construction, but is also applicable to a T-bone type frame, or any other backbone type frame.

As the engine 20 is so mounted that its front cylinder 21 and the crank case 26 are secured to the front end of the main frame 1 and the brackets 12, respectively, the engine 20 per se contributes to improving the rigidity of the vehicle as a whole.

It is obvious that this invention is not only applicable to a motorcycle, but also to a bicycle equipped with a suspension.

According to this invention, in which the main frame is formed by a pair of transversely spaced metal plate members which are joined together, and has a bifurcated portion defined by an inner plate welded between the metal plate members to thereby define a suspension chamber therein, it is possible to provide a sufficiently large space for mounting a suspension therein. The inner plate welded to the metal plate members forming the main frame increases the rigidity of the main frame.

This invention is not to be limited to the embodiments described in the description, which are given by way of example and not of limitation, but only in accordance with the scope of the appended claims.

We claim:

1. In a two-wheeled vehicle including a main frame, a rear arm which is generally triangular in side elevation, said rear arm having a front end pivotally connected to said main frame, and a suspension mounted between the top of said rear arm and said main frame, said main frame comprising a pair of horizontally opposed metal plate members joined together at their forward portions and diverging from one another from a mid-portion to their rear portions, whereby to form a bifurcated portion; and a generally V-shaped inner plate bent aroung generally upright axes covering the insides of said metal plate members where they diverge, said metal plate members being continuously welded to one another in said formed portion, and to said inner plate where they diverge from one another, whereby said inner plate reinforces said frame where the metal plate members diverge, and forms, therewithin a chamber in which said suspension is mounted.

2. Apparatus according to claim 1 including said suspension means connected to said inner plate, and said rear arm pivotally mounted to said main frame and pivotally connected to said suspension means to cause said suspension means to shorten and elongate as said rear arm deflects up and down.

3. Apparatus according to claim 1 in which said metal plate members are bulged sidewardly, and joined at their edges to each other and to the inner plate, whereby to form a hollow frame.

* * * * *